United States Patent
Marr et al.

(10) Patent No.: US 8,062,169 B2
(45) Date of Patent: Nov. 22, 2011

(54) SYSTEM FOR CONTROLLING A HYBRID ENERGY SYSTEM

(75) Inventors: Jerry D. Marr, Dunlap, IL (US); Benjamin A. Treichel, Peoria, IL (US); Anthony C. Rodman, Chillothe, IL (US)

(73) Assignee: Caterpillar Inc., Peoria, IL (US)

( * ) Notice: Subject to any disclaimer, the term of this patent is extended or adjusted under 35 U.S.C. 154(b) by 825 days.

(21) Appl. No.: 11/797,011

(22) Filed: Apr. 30, 2007

(65) Prior Publication Data

US 2008/0269009 A1    Oct. 30, 2008

(51) Int. Cl.
*B60K 1/02* (2006.01)

(52) U.S. Cl. .......................................... 477/3

(58) Field of Classification Search ...... 477/4; 903/930, 903/940; 180/65.31
See application file for complete search history.

(56) References Cited

U.S. PATENT DOCUMENTS

| | | | |
|---|---|---|---|
| 5,583,406 A | 12/1996 | Mutoh et al. | |
| 5,923,093 A | 7/1999 | Tabata et al. | |
| 5,941,328 A | 8/1999 | Lyons et al. | |
| 6,452,286 B1 * | 9/2002 | Kubo et al. | 290/40 C |
| 6,585,066 B1 | 7/2003 | Koneda et al. | |
| 6,739,418 B2 | 5/2004 | Ogata et al. | |
| 6,908,162 B2 | 6/2005 | Obayashi et al. | |
| 7,014,586 B2 | 3/2006 | Randall | |
| 7,034,482 B2 | 4/2006 | Komiyama et al. | |
| 7,063,641 B2 | 6/2006 | Yang | |
| 7,063,912 B2 | 6/2006 | Vuk et al. | |
| 7,081,060 B2 | 7/2006 | Hata et al. | |
| 7,082,850 B2 | 8/2006 | Hughes | |
| 7,083,545 B2 | 8/2006 | Ibamoto et al. | |
| 7,086,226 B2 | 8/2006 | Oguri | |
| 7,086,977 B2 | 8/2006 | Supina et al. | |
| 7,101,298 B2 | 9/2006 | Sowul et al. | |
| 7,125,362 B2 | 10/2006 | Beaty et al. | |
| 7,128,675 B2 | 10/2006 | Klemen et al. | |
| 7,128,677 B2 | 10/2006 | Supina et al. | |
| 7,128,680 B2 | 10/2006 | Holmes | |
| 7,150,288 B2 | 12/2006 | Long et al. | |
| 7,160,224 B2 | 1/2007 | Hsieh et al. | |
| 7,163,480 B2 | 1/2007 | Supina et al. | |
| 7,172,525 B2 | 2/2007 | Sowul et al. | |

(Continued)

FOREIGN PATENT DOCUMENTS

EP    1080983    3/2001

(Continued)

OTHER PUBLICATIONS

International Search Report for PCT/US2008/003283 dated as completed on Jul. 3, 2008 (4 pages).

*Primary Examiner* — David D Le
*Assistant Examiner* — Erin D Bishop
(74) *Attorney, Agent, or Firm* — Finnegan, Henderson, Farabow, Garrett & Dunner LLP (57) ABSTRACT

A method and apparatus are disclosed for controlling a hybrid energy system including a method of storing energy within a hybrid energy system. The hybrid energy system includes a traction load and a first energy consuming system configured to maintain a first criteria within a first operating range. The method includes receiving energy into the hybrid energy system from the traction load and distributing a first energy to the first energy consuming system when the first criteria is within the first operating range.

14 Claims, 3 Drawing Sheets

U.S. PATENT DOCUMENTS

| | | |
|---|---|---|
| 7,178,619 B2 | 2/2007 | Oono |
| 7,191,856 B2 | 3/2007 | Morishita et al. |
| 7,192,373 B2 | 3/2007 | Bucknor et al. |
| 7,192,382 B2 | 3/2007 | Imazu et al. |
| 7,192,383 B2 | 3/2007 | Shimada et al. |
| 7,195,573 B2 | 3/2007 | Bezian et al. |
| 7,195,574 B2 | 3/2007 | Mattsson |
| 7,195,575 B2 | 3/2007 | Kempf |
| 7,203,578 B2 | 4/2007 | Kuang et al. |
| 7,204,776 B2 | 4/2007 | Minagawa et al. |
| 2005/0007049 A1 | 1/2005 | Kim |
| 2006/0005737 A1 | 1/2006 | Kumar |
| 2006/0019784 A1 | 1/2006 | Sowul et al. |
| 2006/0019785 A1 | 1/2006 | Holmes et al. |
| 2006/0025259 A1 | 2/2006 | Klemen et al. |
| 2006/0025260 A1 | 2/2006 | Klemen et al. |
| 2006/0025262 A1 | 2/2006 | Kleman et al. |
| 2006/0025263 A1 | 2/2006 | Sowul et al. |
| 2006/0025264 A1 | 2/2006 | Sowul et al. |
| 2006/0025265 A1 | 2/2006 | Sowul et al. |
| 2006/0096414 A1 | 5/2006 | Gochenour |
| 2006/0105875 A1 | 5/2006 | Morscheck et al. |
| 2006/0105876 A1 | 5/2006 | Holmes |
| 2006/0116231 A1 | 6/2006 | Supina et al. |
| 2006/0128513 A1 | 6/2006 | Tata et al. |
| 2006/0128523 A1 | 6/2006 | Yamamoto et al. |
| 2006/0148604 A1 | 7/2006 | Raghavan et al. |
| 2006/0148605 A1 | 7/2006 | Raghavan et al. |
| 2006/0148606 A1 | 7/2006 | Bucknor et al. |
| 2006/0148609 A1 | 7/2006 | Roethler et al. |
| 2006/0154771 A1 | 7/2006 | Klemen et al. |
| 2006/0154772 A1 | 7/2006 | Schmidt et al. |
| 2006/0166773 A1 | 7/2006 | Raghavan et al. |
| 2006/0166774 A1 | 7/2006 | Supina et al. |
| 2006/0166784 A1 | 7/2006 | Tabata et al. |
| 2006/0169502 A1 | 8/2006 | Kano et al. |
| 2006/0169503 A1 | 8/2006 | Oliver et al. |
| 2006/0169504 A1 | 8/2006 | Oliver et al. |
| 2006/0172849 A1 | 8/2006 | Oliver et al. |
| 2006/0175239 A1 | 8/2006 | Johnson et al. |
| 2006/0183588 A1 | 8/2006 | Schmidt et al. |
| 2006/0183590 A1 | 8/2006 | Jackson |
| 2006/0189427 A1 | 8/2006 | Raghavan et al. |
| 2006/0189428 A1 | 8/2006 | Raghavan et al. |
| 2006/0196748 A1 | 9/2006 | Groddeck et al. |
| 2006/0196750 A1 | 9/2006 | Groddeck et al. |
| 2006/0197375 A1 | 9/2006 | Delaney |
| 2006/0201725 A1 | 9/2006 | Kano et al. |
| 2006/0217230 A1 | 9/2006 | Tanaka |
| 2006/0223663 A1 | 10/2006 | Bucknor et al. |
| 2006/0229152 A1 | 10/2006 | Bucknor et al. |
| 2006/0229153 A1 | 10/2006 | Bucknor et al. |
| 2006/0240928 A1 | 10/2006 | Raghavan et al. |
| 2006/0240929 A1 | 10/2006 | Raghavan et al. |
| 2006/0243502 A1 | 11/2006 | Weber et al. |
| 2006/0247081 A1 | 11/2006 | Yamauchi et al. |
| 2006/0247083 A1 | 11/2006 | Yamauchi et al. |
| 2006/0247086 A1 | 11/2006 | Watanabe et al. |
| 2006/0260853 A1 | 11/2006 | Ando et al. |
| 2006/0264296 A1 | 11/2006 | Moeller |
| 2006/0266569 A1 | 11/2006 | Fujiwara et al. |
| 2006/0267447 A1 | 11/2006 | Buttner et al. |
| 2006/0272614 A1 | 12/2006 | Bevan et al. |
| 2006/0276287 A1 | 12/2006 | Lang et al. |
| 2006/0276288 A1 | 12/2006 | Iwanaka et al. |
| 2006/0276289 A1 | 12/2006 | Hirata et al. |
| 2006/0276952 A1 | 12/2006 | Niessen et al. |
| 2006/0283350 A1 | 12/2006 | Kumar et al. |
| 2006/0284601 A1 | 12/2006 | Salasoo et al. |
| 2006/0287150 A1 | 12/2006 | Kim et al. |
| 2006/0289209 A1 | 12/2006 | Grosspietsch et al. |
| 2007/0010364 A1 | 1/2007 | Bucknor et al. |
| 2007/0021256 A1 | 1/2007 | Klemen et al. |
| 2007/0021257 A1 | 1/2007 | Klemen et al. |
| 2007/0021258 A1 | 1/2007 | Conlon |
| 2007/0021259 A1 | 1/2007 | Tenberge |
| 2007/0021267 A1* | 1/2007 | Obayashi et al. ............. 477/107 |
| 2007/0042852 A1 | 2/2007 | Bucknor et al. |
| 2007/0042858 A1 | 2/2007 | Raghavan et al. |
| 2007/0049441 A1 | 3/2007 | Schmidt |
| 2007/0049443 A1 | 3/2007 | Schmidt |
| 2007/0066432 A1 | 3/2007 | Schmidt |
| 2007/0072723 A1 | 3/2007 | Klemen et al. |
| 2007/0072724 A1 | 3/2007 | Raghavan et al. |
| 2007/0072725 A1 | 3/2007 | Bucknor et al. |
| 2007/0078040 A1 | 4/2007 | Nobumoto et al. |
| 2007/0082782 A1 | 4/2007 | Eguchi et al. |

FOREIGN PATENT DOCUMENTS

| | | |
|---|---|---|
| JP | 06 178401 | 6/1995 |
| JP | 07 143609 | 6/1995 |
| JP | 10023603 A | 1/1998 |
| JP | 11-332007 | 11/1999 |

* cited by examiner

SYSTEM FOR CONTROLLING A HYBRID ENERGY SYSTEM

TECHNICAL FIELD

The present disclosure relates to a hybrid energy system and, more particularly, to a method and apparatus for controlling a hybrid energy system.

BACKGROUND

Hybrid energy systems typically include a an engine having its prime mover, e.g., a crankshaft, mechanically decoupled from one or more loads, e.g., a vehicle traction device load. Hybrid energy systems usually also include an energy storage device configured to store energy received from either the engine during an engine overpowering mode or from a traction device during a vehicle dynamic braking mode. The engine and storage device are often electrically coupled to loads, e.g., via a motor-generator, allowing the engine to also operate as an energy source rather than a conventional drive mechanism and allowing the storage device to recover the energy regenerated from the dynamic braking device. The amount and frequency of regenerated energy is usually independent of the capacity limit for energy stored within the storage device and often exceeds the capacity limit. Over charging the storage device may cause damage thereto and the regenerated energy may be undesirably wasted as heat to avoid or reduce the damage.

U.S. Patent Application No. 2006/0005737 ("the '737 application") filed by Kumar discloses a hybrid energy storage method. The '737 application includes an energy management processor to determine present and upcoming travel path situation information to determine power storage requirements as a function of the capacity of energy that a primary storage device can store and/or receive. Based on these determinations, the energy management processor further determines which of a plurality of energy sources such as the regenerated energy, the prime mover, or a secondary storage device should be used to charge the energy storage device. The '737 application also includes routing energy that the primary storage device is unable to receive and/or store to an optional energy source such as a secondary storage device. The '737 application further includes routing energy that the secondary storage device is unable to receive and/or store to braking grids for dissipation as heat energy.

Although, the '737 application may determine power storage requirements as a function of upcoming travel path information and selectively determine which of a plurality of energy sources should charge the primary energy storage device, it may undesirably waste regenerated energy through heat dissipation.

The present disclosure is directed to overcoming one or more of the shortcomings set forth above.

SUMMARY OF THE INVENTION

In one aspect, the present disclosure is directed to a method of storing energy within a hybrid energy system. The hybrid energy system includes a traction load and a first energy consuming system configured to maintain a first criteria within a first operating range. The method includes receiving energy into the hybrid energy system from the traction load and distributing a first energy to the first energy consuming system when the first criteria is within the first operating range.

In another aspect, the present disclosure is directed to a hybrid energy system including first, second, and third energy sources. The system also includes at least one auxiliary load configured to at least effect a first criteria within a first range of operating values as a function of energy selectively directed thereto. The system further includes a controller configured to selectively direct energy from at least one of the first, second, or third energy sources to the at least one auxiliary load when the first criteria is within the first range of operating values.

In yet another aspect, the present disclosure is directed to a method for controlling a hybrid energy system. The method includes determining a first amount of energy indicative of an amount of energy regenerated from a traction load and determining a second amount of energy indicative of an amount of energy within an energy storage device. The method also includes determining at least one operating condition of at least one energy consuming system and distributing at least a portion of the first amount of energy to either the energy storage device or the at least one energy consuming system.

DETAILED DESCRIPTION

Figure 1:
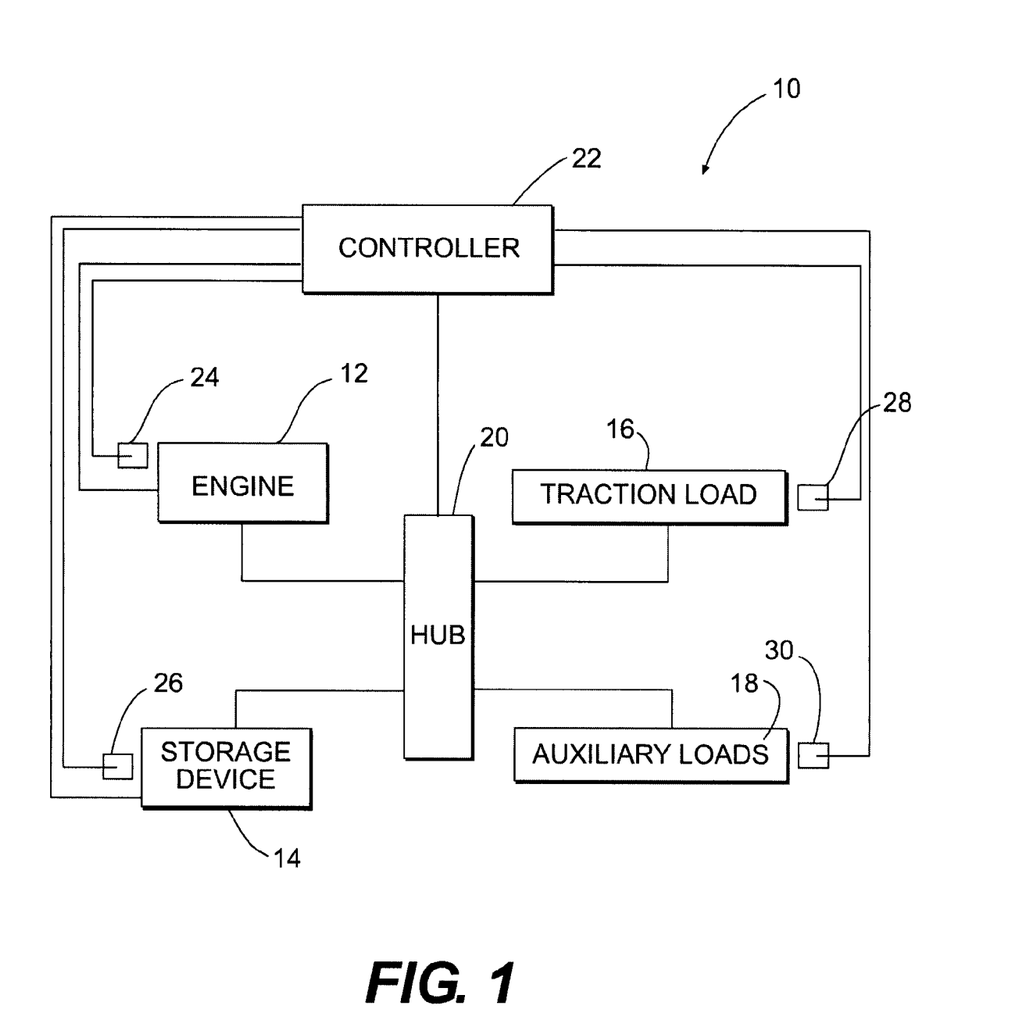
FIG. 1 is a diagrammatic illustration of an exemplary hybrid energy system in accordance with the present disclosure.

FIG. 1 illustrates an exemplary hybrid energy system 10. Specifically, system 10 may include an engine 12 and a storage device 14 and may be configured to selectively supply energy to a traction load 16 and auxiliary loads 18 via a hub 20. Hub 20 may selectively receive energy from engine 12 and/or traction load 16 and direct received energy to storage device 14, traction load 18, and/or auxiliary loads 18. System 10 may also include a controller 22 to operatively control the operation of engine 12 and storage device 14 and/or direct energy to one or more components of system 10 via hub 20. System 10 may be operatively associated with a machine, such as, for example, a locomotive, an on- or off-highway vehicle, a generator set, and/or other work performing machine. It is contemplated that system 10 may include one or more additional and/or different components, such as, for example, a transmission device, gearing, electrical and/or hydraulic conduits, and/or other components known in the art.

Engine 12 may include any source of power, for example, a gasoline or diesel combustion engine, a fuel cell, a natural gas engine, and/or any other energy producing device known in the art. Engine 12 may also include a prime mover, e.g., a crankshaft, (not shown) that is mechanically decoupled from traction load 16 and auxiliary loads 18. Engine 12 may be operatively connected to hub 20 via an electrical and/or hydraulic circuit and may effectively operate as a source of energy. Engine 12 may be controlled by controller 22 to selectively vary the amount of energy output therefrom as a function of controller 22 varying one or more operating parameters of engine 12, e.g., an amount of fuel injected into a combustion chamber or the timing of intake and exhaust valves.

Storage device 14 may include any source of energy, such as, for example, an electrical circuit, and may be configured to selectively receive, store, and deliver energy. Storage device 14 may include an electrical circuit receiving energy from engine 12 and/or traction load 16 via hub 20, storing energy within a battery, and/or delivering energy to traction load 16 and/or auxiliary loads 18. As such, storage device 14 may receive electrical energy, e.g., electrical current and/or voltage, from hub 20 and may store the electrical energy within the battery. It is contemplated that storage device 14 may include any quantity, type, and/or size of batteries and/or other components known in the art. It is also contemplated that storage device 14 may include one or more capacitors configured to store electrical energy. It is further contemplated that storage device 14 may be, alternatively configured as a hydraulic circuit with one or more pumps and/or accumulators configured to receive and store hydraulic energy, e.g., pressurized fluid.

Traction load 16 may include one or more propulsion components of a machine such as, for example, a traction device, a marine propeller, a generator set, and/or any type of propulsion load known in the art. Specifically, traction load 16 may operate to consume energy directed from hub 20 in a propulsion mode, and traction load 16 may operate to produce energy directed toward hub 20 in a dynamic braking mode. For example, traction load 16 may include a motor-generator configured to, in a propulsion mode, convert electrical energy received from hub 20 into mechanical energy to be delivered to one or more axles. Additionally, the motor-generator may be configured to, in a dynamic braking mode, convert mechanical energy received from one or more axles into electrical energy to be delivered to hub 20. Traction load 16 may be a variable load, may be periodically operated, may dynamically change during operation of system 10, and may affect one or more operating parameters of engine 12 and/or storage device 14 to correspondingly change. For example, traction load 16 may vary as traction devices interact with different materials and/or different grades of a surface, traction load 16 may vary as inertia of one or more driven components increases or decreases, and/or may vary in any manner known in the art.

Auxiliary loads 18 may include one or more non-propulsion components of a machine such as, for example, emission reducing systems, engine cooling systems, engine lubrication systems, HVAC systems, braking system, hydraulic systems, electric motor systems, and/or any type of non-propulsion load known in the art. For example, auxiliary loads 18 may include a radiator fan, an oil pump, a catalyst trap regenerator, an HVAC compressor or fan, a steering fluid pump, a brake fluid pump, an inlet air heater, a catalyst heater, electric motor fans, and/or any other component known in the art. Auxiliary loads 18 may be variable loads, may be periodically operated, may have variable operating durations and/or schedules, and/or may be essential or non-essential to achieve a desirable and/or required operation of system 10 or components thereof. For example, a catalyst trap regenerator might require regeneration once a day to provide a desirable amount of exhaust emissions, an oil pump might require continuous operation to provide desirable lubrication of engine 12, and/or an HVAC fan might require periodic operation to provide a desirable temperature within an operator's cab. It is contemplated that each of auxiliary loads 18 may have an operating range within which the component may be operated, e.g., turned on, and outside of the component may be deactivated, e.g., turned off or idled.

Hub 20 may be configured to selectively receive energy from engine 12 and/or traction load 16, convert mechanical into electrical energy, and/or deliver electrical energy to storage device 14 and/or auxiliary loads 18. Hub 20 may include any conventional motor-generator configured to receive mechanical energy, rotate a rotor thereof, and generate an electrical current within a stator thereof. Hub 20 may also include any conventional inverter. The operation of a motor-generator and an inverter is well known in the art and is not further described. Hub 20 may also include one or more conventional switches configured to selectively direct and effect the direction and destination of the electrical energy. The one or more switches may include mechanical or virtual, e.g., software, switches, and are well known in the art and are not further described. It is contemplated that hub 20 may additionally include an electrical circuit interconnecting the various components thereof. It is also contemplated that hub 20 may include hydraulic circuit with one or more pumps and/or accumulators configured to receive and/or distribute hydraulic energy, e.g., pressurized fluid.

Controller 22 may include one or more microprocessors, a memory, a data storage device, a communications hub, and/or other components known in the art. Specifically, controller 22 may monitor one or more parameters of system 10 and may affect the operation of engine 12, storage device 14, and/or hub 20. It is contemplated that controller 22 may be integrated within a general machine control system capable of controlling additional various functions of the machine with which system 10 may be associated. Controller 22 may be configured to receive input signals from one or more sensors 24, 26, 28, 30, perform one or more algorithms to determine appropriate output signals, and may deliver the output signals to affect control of engine 12, storage device 14, and/or hub 20. For example, controller 22 may control the amount of fuel delivered to engine 12, the timing of intake and exhaust valves associated with engine 12, the directional flow of electrical current associated with storage device 14, the inverter, motor-generator, and/or switches of hub 22, additional functions and/or parameters associated with engine 12, storage device 14 and/or hub 22 known in the art, and/or one or more combinations thereof. It is contemplated that controller 22 may also receive and deliver signals via one or more communication lines (not referenced) as is known in the art.

Sensors 24, 26, 28, 30 may include may each include one or more conventional sensors configured to establish a signal as a function of a sensed physical parameter. Sensors 24 may be configured to sense one or more operating parameters of engine 12. For example, sensors 24 may be configured to sense an amount or rate of delivered fuel, rotational speed of a crankshaft, exhaust or intake valve timing, manifold pressures and/or temperatures, engine temperature, any other parameter known in the art, and/or any combination thereof. Sensors 26 may be configured to sense one or more operating parameters of storage device 14. For example, sensors 26 may be configured to sense a charge or voltage associated with a battery, any other parameter known in the art, and/or combinations thereof. Sensors 28, 30 may be configured to sense one or more operating parameters of traction load 16 and auxiliary loads 18, respectively. For example, sensors 28, 30 may be configured to sense an amount of torque, a rotational speed, a time duration, an amount of energy supplied thereto, any other parameter known in the art, and/or combinations thereof.

It is contemplated that sensors 24, 26, 28, 30 may include a plurality of sensors establishing a plurality of signals with respect to a common operating parameter and that the plurality of signals may be combinable into a common signal by, for example, averaging or summing. It is also contemplated that sensors 24, 26, 28, 30 may embody any type of sensor known in the art, such as, for example, infrared or radar sensors, flow meters, thermocouples, pressure transducers, and/or any other sensor known in the art. It is further contemplated that sensors 24, 26, 28, 30 may be disposed at any location relative to engine 12, storage device 14, traction load 16, and auxiliary loads 18, respectively.

Figure 2:
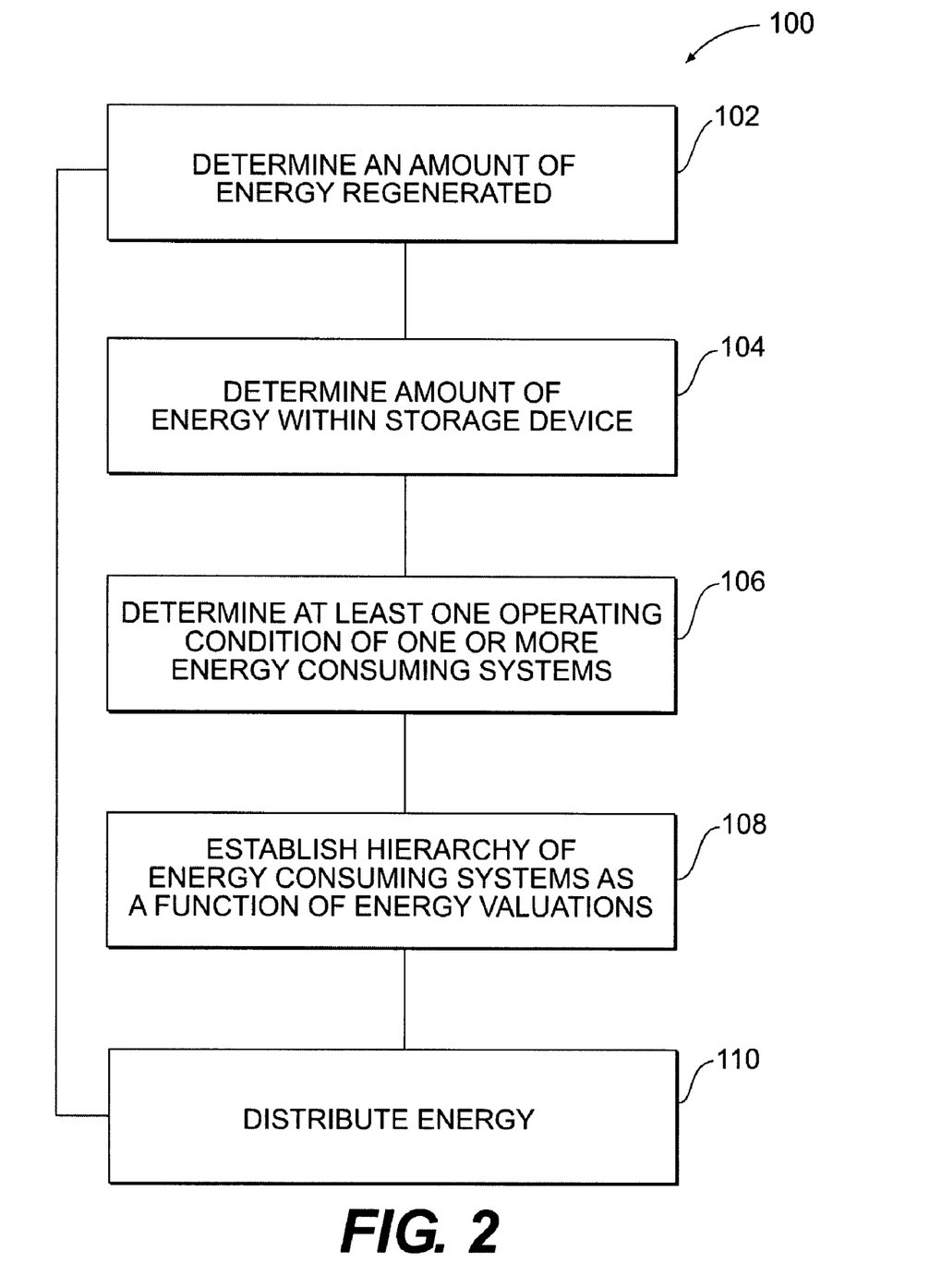
FIG. 2 is a schematic block diagram of an exemplary method configured to be performed by the controller of FIG. 1.

FIG. 2 illustrates an exemplary control method 100. Method 100 may be performed by controller 22 to control hybrid energy system 10. Specifically, method 100 may include determining an amount of energy regenerated, step 102, and determining an amount of energy within storage device 14, step 104. Method 100 may also include determining at least one operating condition of one or more energy consuming systems, step 106, and establishing a hierarchy of energy consuming systems as a function of energy valuations, step 108. Method 100 may further include distributing energy, step 110. It is contemplated that method 100 may return to step 102 after step 110. It is also contemplated that the steps of method 100 may be performed in any order and are described herein with a particular order for exemplary purposes only. It is further contemplated that method 100 may be performed continuously and/or periodically, with or without a uniform frequency.

Step 102 may include determining an amount of energy regenerated. Specifically, controller 22 may receive one or more signals from sensors 28 indicative of the operating condition of traction load 16. Controller 22 may determine that traction load 16 is operating in a regenerative breaking mode and may determine the amount of electrical energy produced by traction load 16. For example, controller 22 may receive a signal from sensors 28 indicative of the direction and speed of one or more rotating elements of traction load 16, such as, for example, an axle or a rotor, and may perform one or more algorithms, e.g., a mathematical equation, one or more look-up tables or maps, and/or any other functional relation, to determine the amount of electrical energy regenerated. It is contemplated that step 102 may include determining an amount of energy regenerated as a function of any parameter known in the art.

Step 104 may include determining an amount of energy within storage device 14. Specifically, step 104 may include controller 22 receiving one or more signals from sensors 26 indicative of one or more operating parameters of storage device 14 to estimate an amount of energy available from storage device 14. For example, step 104 may include controller 22 receiving a signal indicative of a voltage within a battery and perform one or more algorithms, e.g., a mathematical equation, one or more look-up tables or maps, and/or any other functional relation, to determine the amount of electrical energy within storage device 14. It is contemplated that step 104 may include determining an amount of energy associated with storage device 14 as a function of any parameter known in the art.

Step 106 may include determining at least one operating condition of one or more energy consuming systems. Specifically, step 106 may include controller 22 receiving one or more signals from sensors 30 indicative of one or more operating parameters of auxiliary loads 18. For example, step 106 may include controller 22 receiving a signal indicative of a temperature, e.g., an engine coolant temperature, an electric motor temperature, an HVAC temperature, a catalyst temperature, and/or any other temperature parameter known in the art associated with system 10. As such, controller 22 may, for example, determine that the operating condition of a respective energy consuming system is within a first range of operating conditions, e.g., a desired operating range, if a given criteria, e.g., the operating temperature, is above a minimum value, e.g., a minimum temperature, and below a maximum value, e.g., a maximum temperature. Alternatively, controller 22 may, for example, determine that the operating condition of the respective energy consuming system is outside the desirable range of operating conditions if the given criteria is below the minimum value or above the maximum value. Additionally, controller 22 may, for example, determine that the operating condition of the respective energy consuming system is likely to transition into or out of the first range of operating conditions if the given criteria is close to the minimum or maximum values. It is contemplated that step 106 may include determining an operating condition of any type of energy consuming system as the function of any type of given criteria having any relation to any range of operational values. It is also contemplated that the given criteria and/or the range of operating conditions may be, for example, predetermined, adjustable, and/or dynamic.

Step 108 may include establishing a hierarchy of energy consuming systems as a function of energy valuations. Specifically, step 108 may include arranging the one or more energy consuming systems via a method 200. Step 108 and, in particular, method 200 will be further described below with reference to FIG. 3.

Step 110 may include distributing energy. Specifically, step 110 may include distributing the amount of energy regenerated, e.g., the amount of energy determined in step 102, among the one or more energy consuming systems as a function of the hierarchy established in step 108. For example, step 110 may include controller 22 affecting the operation of one or more components of hub 20 to control the direction and destination of energy to auxiliary loads 18 and/or storage device 14. Step 110 may include distributing a portion of the energy regenerated to the energy consuming system having the highest rank, distributing another portion of the amount of energy regenerated to the energy consuming system having the second highest rank, distributing substantially all of the amount of energy regenerated to the energy consuming system having the highest rank, and/or distributing the amount of energy regenerated according to any desired method.

Figure 3:
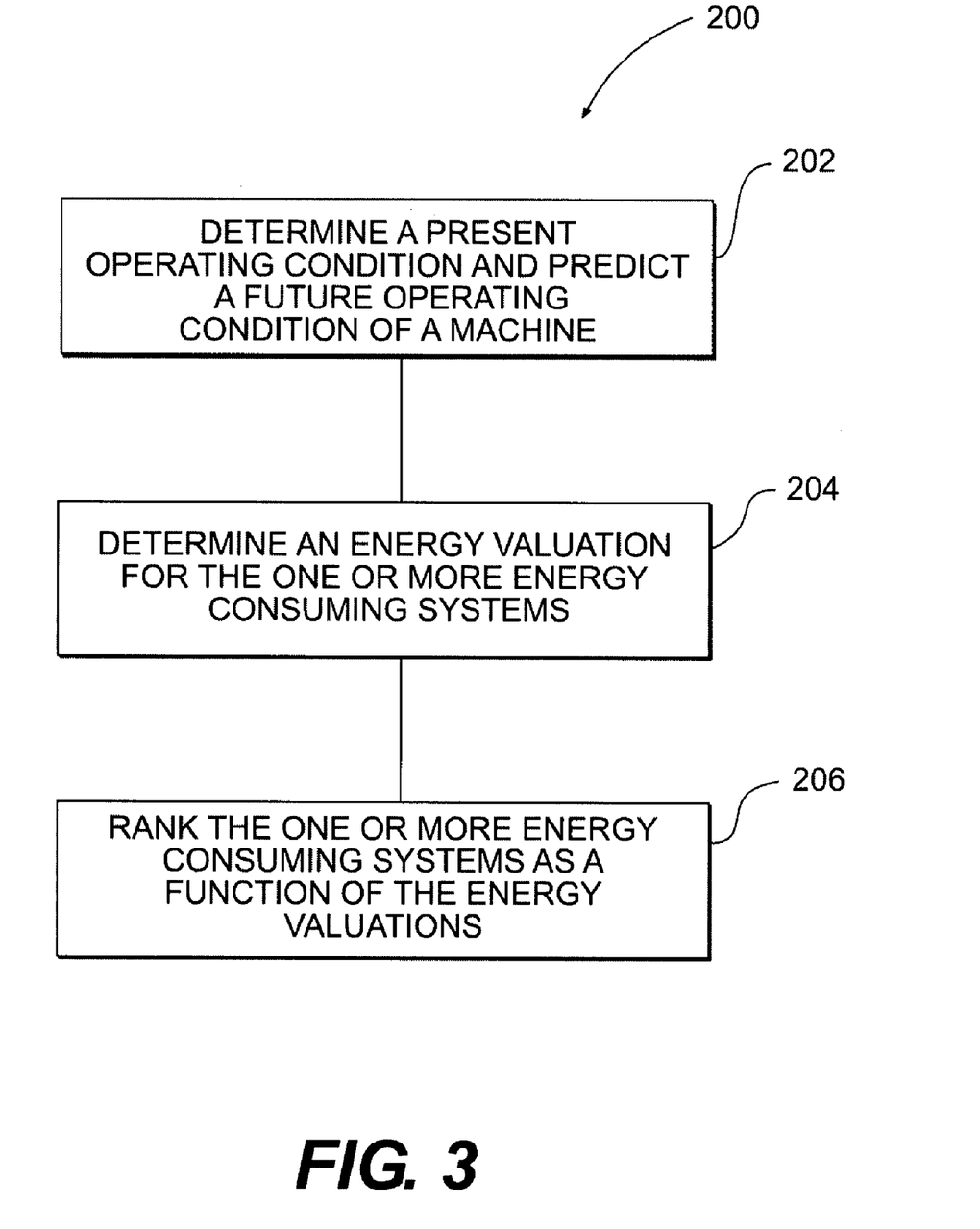
FIG. 3 is a schematic block diagram of an exemplary method for establishing a hierarchy in accordance with the method of FIG. 2.

FIG. 3 illustrates an exemplary method 200. Method 200 may include determining a present operating condition and predicting a future operating condition of a machine, step 202. Method 200 may also include determining an energy valuation for the one or more energy consuming systems, step 204, and ranking the energy consuming system as a function of the determined energy valuations, step 206.

Step 202 may include determining a present operating condition and predicting a future operating condition of a machine, e.g., a vehicle, with which system 10 may be operatively associated. Specifically, step 202 may include receiving one or more signals from sensors 24, 26, 28, 30 indicative of one or more operating parameters of engine 12, storage device 14, traction load 16, and auxiliary loads 18. Additionally, step 202 may include controller 22 functionally relating the one or more received signals with one another and/or with one or more additional signals such as, for example, a timer or a global positioning system. As such, controller 22 may functionally determine the present operating condition and may functionally predict a future operating condition of the machine by performing one or more algorithms, e.g., a mathematical equation, one or more look-up tables or maps, and/or any other functional relation, to determine the future operating condition of the associated machine. For example, controller 22 may determine that engine 12 is operating in a transient condition transitioning from a low-speed/high-torque operating condition to a high-speed/low-torque operating condition and may, correspondingly, determine that the associated machine is accelerating. Similarly, controller 22 may determine that engine 12 is operating in a steady state condition maintaining a high-speed operating condition and may, correspondingly, predict that the associated machine may experience a deceleration at a future point in time and that system 10 may operate in a dynamic braking mode at a future point in time. It is contemplated that step 202 may include controller 22 functionally relating any operating parameters to determine present and predict future operating conditions of an associated machine. It is also contemplated that the associated machine and system 10 may be configured to presently operate and/or transition into any operating condition known in the art.

Step 204 may include determining an energy valuation for the at least one energy consuming system. Specifically, step 204 may include determining an energy valuation for the one or more energy consuming systems as a function of the predicted effect that a given amount of energy, e.g., a unit energy, may have on the first criteria with respect to similarly determined energy valuations for other ones of the one or more energy consuming systems. For example, step 204 may include controller 22 establishing a first energy valuation for a first energy consuming system as a function of the predicted effect that a unit energy may have on a first criteria and establishing a second energy valuation for a second energy consuming system as a function of the predicted effect that a unit energy may have on a second criteria.

Additionally, step 204 may functionally compare the determined first and second established effects with one another and determine that the first effect may be more desirable than the second effect. That is, the first effect may be predicted to have a greater payback or rate of return per unit energy than the second effect. It is contemplated that the relative payback or rate of return may be characterized according to any method, such as, for example, the cost of energy, increased or decreased efficiency in the operation of an energy consuming system, whether or not the operation of an energy consuming system is continuous, periodic, as-needed, mandatory, delayable, presently-necessary, and/or interruptible, the effect on one or more other energy consuming systems, other components of system 10 or the associated machine. For example, a first energy consuming system, e.g., an emission reducing system, may be characterized as a mandatory-periodic system and a second energy consuming system, e.g., an HVAC system, may be characterized as an as-needed-periodic system. As such, controller 22 may establish an energy valuation for the emission reducing system to be higher than an energy valuation for the HVAC system because the payback associated with a unit energy for a mandatory-periodic system may be greater, e.g., more desirable, than the payback associated with a unit energy for an as-needed-periodic system.

It is also contemplated that the payback or rate of return, and thus the energy valuation for an energy consuming system, may be dynamic and that step 204 may be configured to account for the changing characterizations of the energy consuming systems. For example, an emission reducing system characterized as a mandatory-periodic system may dynamically change from a delayable characterization to a presently-necessary characterization as a function of, e.g., the time since the last catalyst regeneration or other predicted operating conditions of the associated machine. It is further contemplated that step 204 may determine the payback or rate of return of unit energy as a function of the amount of energy stored within energy storage device 14 and that the regenerated energy may be selectively directed to storage device 14 in addition or as an alternative to being directed to auxiliary loads 18. For example, if energy storage device 14 is near a maximum amount of energy, the relative paybacks for auxiliary loads 18 may be increased, if energy storage device 14 is near a minimum amount of energy, the relative paybacks for auxiliary loads 18 may be decreased, and if energy storage device 14 is between the maximum and minimum amounts of energy, the relative paybacks for auxiliary loads 18 may be substantially unchanged.

Step 206 may include ranking the energy consuming systems as a function of the determined energy valuations. Specifically, step 206 may include arranging the determined energy valuations and the associated energy consuming systems according to any method known in the art. For example, step 206 may include sequentially arranging the energy consuming systems from highest energy valuation to lowest or may include grouping one or more energy consuming systems having energy valuations greater than a predetermined value in a first group and similarly grouping additional energy consuming systems in subsequent groups. As such, step 206 may be configured to arrange the one or more energy consuming systems according to a hierarchy.

INDUSTRIAL APPLICABILITY

The disclosed method and apparatus may be applicable to control any hybrid energy system. The disclosed method and apparatus may advantageously store and direct regenerated energy. The operation of methods 100 and 200 are explained below with reference to system 10 being operatively associated with an on-highway vehicle for exemplary purposes only.

System 10 may be operatively associated with an on-highway vehicle and traction load 16 may be operatively configured to propel the vehicle relative to the highway surface. Traction load 16 may include one or more traction motors configured to receive electrical energy from hub 20 and direct mechanical energy, e.g., torque and speed, to one or more axles and/or wheels. Hub 20 may selectively receive electrical energy from engine 12 and/or storage device 14. Additionally, auxiliary loads 18 may include one or more energy consuming systems and may selectively receive electrical energy from hub 20 for selective operation thereof. Traction load 16 may selectively produce electrical energy during, for example, a dynamic braking mode, and regenerate electrical energy to hub 22. The general operation a hybrid energy system, including a dynamic braking mode and regenerated energy is well known in the art and is not further explained. Electrical energy directed to hub 22 from traction load 16 may be further directed from hub 22 to storage device 14 and/or one or more auxiliary loads 18.

Controller 22 may perform methods 100 and 200 to control the distribution of energy among the one or more energy consuming systems. Controller 22 may determine an amount of energy regenerated, step 102, and determine an amount of energy within storage device 14, step 104. Controller may also determine at least one operating condition of at least one energy consuming system, step 106. As such, controller 102 may determine an amount of energy available within system 10 to be distributed, e.g., the amount of energy regenerated, determine the amount of energy stored within energy storage device 14, e.g., the amount of energy on reserve, and determine whether or not energy might be directed toward one or more energy consuming systems.

Controller may also establish a hierarchy of energy consuming systems as a function of respectively associated values of energy, step 108. Specifically, controller 22 may perform method 200 and rank the one or more energy consuming systems, step 206, as a function of the respectively determined energy valuations, step 204. For example, although storage device 14 may not be at capacity, the payback for directing regenerated energy to one of auxiliary loads 18 may be greater than merely directing regenerated energy to storage device 14, even if the amount of regenerated energy would not exceed the capacity of energy storage device 14. That is, the payback associated with directing energy to an emissions system to increase the frequency at which catalyst is regenerated may, for example, decrease the amount of emissions exhausted to the environment and/or increase the operational efficiency of engine 12, which may be more desirable than merely directed the regenerated energy to energy storage device 14.

Additionally, if the amount of regenerated energy would exceed the capacity of energy storage device 14, the payback associated with directing energy to a engine coolant system to reduce the operating temperature of engine 12 may be more desirable than wasting the regenerated energy by not overcharging storage device 14. As such, regenerated energy may be stored within the engine coolant system by selectively directing energy thereto when the energy is available but before energy is required to be directed thereto. That is, selectively directing energy to the engine coolant system when the temperature of the engine coolant system is below a maximum desirable temperature and regenerated energy is available instead of only directed energy to the engine coolant system when the engine coolant temperature exceeds a maximum desirable temperature when regenerated energy may not be available. It is contemplated that regenerated energy may be selective directed toward one or more energy consuming systems to effect the first criteria to exceed the first range of operating criteria. For example, regenerated energy may be directed to an electric motor cooling system to overcool the motor temperature, e.g., exceed the minimum operating temperature, and/or regenerated energy may be directed to an emission reducing system to overheat the catalyst, e.g., exceed the maximum operating temperature.

Because controller 22 is configured to determine the value of energy associated with the one or more energy consuming systems and distribute energy among the one or more energy consuming systems according to the determined values of energy, system 10 may be configured to distribute regenerated energy to one or more of the energy consuming systems having the greatest payback or rate of return on the energy. Additionally, system 10 may be configured to store energy within one or more of the energy consuming systems when the regenerated energy exceeds the capacity of energy storage device 14.

It will be apparent to those skilled in the art that various modifications and variations can be made to the disclosed system for controlling a hybrid energy system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method of storing energy within a hybrid energy system that includes a traction load, an energy storage device, and a first energy consuming system configured to maintain a first criteria within a first operating range, the method comprising:

receiving energy into the hybrid energy system from the traction load; and determining an energy valuation for the first energy consuming system as a function of a predicted effect that a unit of energy will have on the first criteria; and distributing a first energy to the first energy consuming system when an amount of energy stored in the energy storage device is below a maximum capacity of the storage device, the first energy being at least a portion of the received energy.

2. The method of claim 1, wherein receiving energy includes converting mechanical energy into electrical energy during a dynamic braking mode.

3. The method of claim 1, wherein the first energy consuming system is one of a plurality of energy consuming systems, each configured to maintain a respective criteria within a respective operating range.

4. The method of claim 3, further including determining a plurality of energy valuations as a function of a predicted effect that a unit of energy may have on the respective criteria, of the respective on of the plurality of energy consuming systems if the first energy was distributed to the respective one of the plurality of energy consuming systems.

5. The method of claim 1, wherein the hybrid energy system includes a second energy consuming system configured to maintain a second criteria within a second operating range, the method further including:

distributing a second energy to the second energy consuming system when the second criteria is within the second operating range.

6. The method of claim 5, wherein the first and second energies are each less than the received energy.

7. The method of claim 1, wherein the first energy consuming system is one of a engine cooling system, an engine lubrication system, a emissions reducing system, or a heating-ventilation and air-conditioning (HVAC) system.

8. The method of claim 1, wherein:

the first criteria is a temperature;

the first operating range includes a maximum temperature and a minimum temperature; and the first energy consuming system is configured to maintain the temperature between the maximum and minimum operating temperature.

9. A method for controlling a hybrid energy system including a plurality of energy consuming systems each configured to maintain an operating criteria within a respective operating range comprising:

determining a first amount of energy indicative of an amount of energy regenerated from a traction load;

determining a second amount of energy indicative of an amount of energy stored within an energy storage device;

determining at least one operating condition of at least one energy consuming system of the plurality of consuming systems;

predicting an effect that a unit of energy will have on the first operating condition if the first energy is distributed to the first energy consuming system;

determining a rate of return per unit energy of the predicted effect that a unit of energy will have on the first operating condition as a function of the amount of energy stored within the energy storage device: and distributing at least a portion of the first amount of energy to the at least one first energy consuming system as a function of the determined rate of return when the second amount of energy is below a maximum capacity of the energy storage device.

10. The method of claim 9, wherein the at least one energy consuming system is one of a plurality of energy consuming systems, the method further including:

determining a second operating condition associated with a second energy consuming system of the plurality of consuming systems;

predicting an effect that a unit of energy will have on the second operating condition if the first unit of energy is distributed to the second energy consuming system;

determining a rate of return per unit energy of the predicted effect that a unit of energy will have on the second operating condition as a function of the amount of energy stored within the energy storage device;

ranking the first and second energy consuming systems as a function of the respective rates of return for the first and second energy consuming systems: and distributing at least a portion of the first amount of energy among the first and second energy consuming systems, according to the determined ranking.

11. The method of claim 9, wherein the first energy consuming system is one of an emission reducing system, an engine cooling system, an engine lubrication system, or a heating-ventilation-and-air-conditioning (HVAC) system.

12. The method of claim 9, wherein the method further includes directing at least a portion of the first energy via a controller to the first energy consuming system when a first criteria of the respective operating criteria is within a first rang of operating values of the respective operating ranges.

13. A method for controlling a hybrid energy system comprising:

determining a first amount of energy indicative of an amount of energy regenerated from a traction load;

determining a second amount of energy indicative of an amount of energy stored within an energy storage device;

determining first and second operating conditions, wherein the first and second operating conditions are respectively associated with a first and a second energy consuming system, and wherein the first and second energy consuming systems are configured to affect a criteria, respectively associated with the first and second energy consuming systems, within a range of operating values as a function of energy selectively directed thereto;

respectively determining first and second energy valuations for the first and second energy consuming systems as a function of a predicted rate of return that a unit of energy will have on the respective criteria of the first and second energy consuming systems:

comparing the first and second energy valuations with one another;

determining that the first energy valuation has a greater predicted rate of return per unit that the rate of return per unit energy of the second energy valuation; and distributing at least part of the first amount of energy to the first energy consuming system when the second amount of energy is below a maximum capacity of the energy storage device.

14. The method of claim 13, further including:

directing a first portion of the first energy to the first energy consuming system; and directing a second portion of the first energy to the second energy consuming system.

* * * * *